United States Patent Office 3,151,134
Patented Sept. 29, 1964

3,151,134
$\Delta^{9(11)}$-DEHYDRO-ESTRONE, ESTRADIOL, DERIVATIVES THEREOF AND PROCESS FOR PREPARATION
Ernesto Denot and Albert Bowers, Mexico City, Mexico, assignors, by mesne assignments, to Syntex Corporation, a corporation of Panama
No Drawing. Filed Oct. 3, 1961, Ser. No. 142,481
15 Claims. (Cl. 260—397.45)

The present invention relates to certain new cyclopentanoperhydrophenanthrene derivatives and to a method for the preparation of the same.

More particularly, it relates to a new process for introducing a double bond at C–9(11) into compounds of the androstane and pregnane series, which compounds have an aromatic ring A.

More specifically, our invention relates to a new process for preparing $\Delta^{9(11)}$-dehydro-estrone and $\Delta^{9(11)}$-dehydro-estradiol, as well as the novel 17α-alkyl, alkenyl and alkynyl derivatives of $\Delta^{9(11)}$-dehydro-estradiol, their esters and their corresponding 3-alkyl ethers.

These compounds possess anti-androgenic and anti-progestational activity with a minimum of estrogenic activity, lower the cholesterol level in the blood, eliminate the deposition of calcium in the bones and inhibit the secretion of gonadotropins by the pituitary gland.

The present invention also comprises the compounds of the pregnane series having the ring A aromatic, that is, 17β-acetyl-$\Delta^{1,3,5(10),9(11)}$-estratetraen-3-ol and 17β-acetyl-$\Delta^{1,3,5(10),9(11)}$-estratetraene-3,17α-diol, their esters and their 3-alkyl-ethers. These compounds, besides having anti-androgenic activity, also serve as intermediates for the preparation of 19-nor-corticoids.

The novel compounds object of our invention are illustrated by the following formulas:

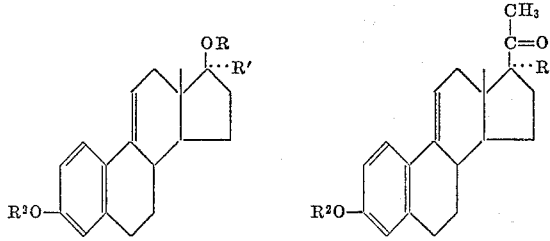

In the above formulas, R represents hydrogen or an acyl radical derived from a mono- or poly-carboxylic acid of up to 12 carbon atoms, saturated or unsaturated, of straight, branched, cyclic or mixed aliphatic-cyclic chain, optionally substituted with groups such as hydroxyl, acyloxy, alkoxy, amino or halogens. Typical such esters are the acetate, propionate, butyrate, hemisuccinate, enanthate, benzoate, trimethylacetate, phenoxyacetate, cyclopentylpropionate, aminoacetate and β-chloropropionate.

$R^1$ represents hydrogen or a lower alkyl, alkenyl or alkynyl radical, such as methyl, ethyl, propyl, vinyl and ethynyl.

$R^2$ represents hydrogen, acyl or a lower alkyl group such as methyl, ethyl; and $R^3$ represents hydrogen, a hydroxyl group or a hydrocarbon carboxylic acyloxy group containing less than 12 carbon atoms. The acyl groups are of the type described above.

The method of our invention consists in treating the aromatic compound of the estrane or pregnane series having the phenolic hydroxyl group in the free form, esterified or etherified, with a dehydrogenating agent, to introduce a double bond between positions C–9 and C–11.

Such dehydrogenation is preferably carried out with a quinone having an oxidation-reduction potential of less than $-0.5$, such as chloranil (tetrachlorobenzoquinone) 2,3-dichloro-5,6-dicyano-1,4-benzoquinone, 2,3-dicyano-1,4-benzoquinone, 2,3,5,6-tetrabromo-1,4-benzoquinone, 2,3,5,6-tetrafluoro-1,4-benzoquinone and the like.

The reaction is carried out under reflux for a period of time between 12 and 24 hours, in a solvent inert to this reaction such as dioxane, tertiary butyl alcohol, amyl alcohol, benzene, toluene, xylene and other similar solvents.

In compounds where the starting material contains a 3-alkylether group, the latter group may be hydrolyzed by treatment with pyridine hydrochloride at 200° C. for a period of time of 30 to 40 minutes or by the action of a hydrogen halide such as hydrogen iodide or bromide.

Optionally, the $\Delta^{9(11)}$-dehydro compounds thus obtained may be esterified at C–3 as well as at C–17, by treating with the anhydride or chloride of an acid of 1 to 12 carbon atoms, by known methods.

Thus, for example, by reacting the methyl ether of estradiol in dioxane-terbutanol solution at the reflux temperature for 24 hours, there is obtained the 3-methyl-ether of $\Delta^{9(11)}$-dehydro-estradiol, which is then hydrolyzed with pyridine hydrochloride to produce $\Delta^{9(11)}$-dehydro-estradiol, which on further treatment with acetic anhydride in pyridine produces the respective diacetate.

The following examples serve to illustrate but are not intended to limit the scope of the invention:

*Example I*

A solution of 1 g. of estrone 3-methyl ether in 15 ml. of anhydrous dioxane and 45 ml. of terbutanol was treated with 4.0 g. of chloranil (recrystallized from benzene) and the mixture was refluxed under an atmosphere of nitrogen for 24 hours.

The mixture was cooled, the suspended solid was removed by filtration and the solvents were then removed under reduced pressure. There was thus obtained 990 mg. of residue which was chromatographed on 30 g. of alumina. The fractions eluted with pure hexane afforded 410 mg. of the 3-methyl ether of $\Delta^{9(11)}$-dehydro-estrone; M.P. 145–148° C., $[\alpha]_D+299°$ (CHCl$_3$);

$$\lambda_{max.}^{EtOH}\ 264\ m\mu,\ \log \epsilon\ 4.26$$

A mixture of 600 mg. of the 3-methyl-ether of $\Delta^{9(11)}$-dehydro-estrone and 1.5 g. of pyridine hydrochloride was heated at 200–210° C. for 40 minutes under an atmosphere of nitrogen and then cooled. There was then added 100 ml. of water and the precipitate formed was collected, well washed with water, dried and crystallized from methanol, thus yielding $\Delta^{9(11)}$-dehydro-estrone; M.P. 248–251° C., $[\alpha]_D+195°$ (EtOH), $\lambda_{max.}$ 266 m$\mu$, log $\epsilon$ 4.26.

*Example II*

In accordance with the preceding method, but substituting the 3-methyl-ether of estrone by the 3-methyl-ether of estradiol, there was obtained the 3-methyl-ether of $\Delta^{9(11)}$-dehydro-estradiol.

By treating 1.3 g. of the above compound with 3.0 g. of pyridine hydrochloride at 210° C. for 40 minutes under an atmosphere of nitrogen, there was finally obtained $\Delta^{9(11)}$-dehydro-estradiol, which after crystallization from aqueous acetone showed M.P. 174–175° C., $[\alpha]_D+127°$, $$\lambda_{max.}^{EtOH}\ 264\ m\mu,\ \log \epsilon\ 4.23.$$

Acetylation of 500 mg. of the above compound with 4 ml. of pyridine and 8 ml. of acetic anhydride at room temperature for 24 hours, followed by dilution with water, filtration of the precipitate and crystallization from methanol, afforded the 3,17-diacetate of Δ⁹⁽¹¹⁾-dehydro-estradiol with M.P. 134–135° C., [α]_D +79°, $\lambda_{max.}^{EtOH}$ 258–260 mμ, log ε 4.26

Example III

A solution of 1 g. of estrone in 20 ml. of anhydrous dioxane was refluxed for 24 hours with 1.1 g. of 2,3-dichloro-5,6-dicyano-1,4-benzoquinone. The mixture was diluted with 100 ml. of ethyl acetate and the organic solution was washed with 200 ml. of 10% aqueous sodium hydroxide solution, then washed with water to neutral, dried over anhydrous sodium sulfate and evaporated to dryness under reduced pressure.

The crystalline residue was dissolved in acetone and the solution was passed through a chromatographic column with 40 g. of alumina; the less polar crystalline fractions were combined and recrystallized from methylene chloride-hexane, thus furnishing 750 mg. of Δ⁹⁽¹¹⁾-dehydroestrone identical with the one obtained in Example I.

Example IV

By following the method described in Example I, 3-methoxy - 17α-methyl-estradiol and 17α-propyl-estradiol were converted into the corresponding Δ⁹⁽¹¹⁾-dehydro derivatives.

Example V

To a solution of 500 mg. of the methyl ether of Δ⁹⁽¹¹⁾-dehydro-estradiol in 2 cc. of pyridine was added 1 cc. of benzoyl chloride and the mixture was heated on the steam bath for 1 hour, then poured into water and the precipitate formed was collected by filtration. Crystallization from chloroform-methanol furnished the benzoate of 3-methoxy-Δ⁹⁽¹¹⁾-dehydro-estradiol.

Example VI

By following the method described in Example III 0.7 g. of 17α-vinyl-estradiol (prepared by reaction of estrone with vinyl magnesium bromide) was treated with 20 ml. of dioxane and 770 mg. of 2,3-dichloro-5,6-dicyano-1,4-benzoquinone and the mixture was refluxed for 24 hours under an atmosphere of nitrogen. There was thus obtained 17α-vinyl-Δ⁹⁽¹¹⁾-dehydro-estradiol.

Example VII

By following the method described in Example I, a mixture of 2.7 g. of the 2-methyl-ether of 17α-ethynyl-estradiol, 40 ml. of anhydrous dioxane, 120 ml. of terbutanol and 8 g. of chloranil was refluxed under an atmosphere of nitrogen for 24 hours, thus affording the 3-methyl-ether of 17α-ethynyl-Δ⁹⁽¹¹⁾-dehydro-estradiol. By treating the above compound with 4 g. of pyridine hydrochloride at 200–210° C., there was obtained 17α-ethynyl-Δ⁹⁽¹¹⁾-dehydro-ethradiol.

A mixture of 1 g. of the above compound, 300 mg. of p-toluenesulfonic acid and 10 ml. of acetic acid was kept overnight at room temperature, then poured into water and the precipitate formed was collected, washed with much water to netural, dried and crystallized from methanol-ether. There was thus obtained the diacetate of 17α-ethynyl-Δ⁹⁽¹¹⁾-dehydro-estradiol.

Example VIII

A solution of 2 g. of 17β-acetyl-Δ¹,³,⁵⁽¹⁰⁾-estratrien-3-ol in 200 ml. of a mixture of anhydrous dioxane and terbutanol (50:50) was refluxed for 24 hours under an atmosphere of nitrogen in the presence of 6 g. of chloranil. By then following the procedure already described, there was obtained finally 17β-acetyl-Δ¹,³,⁵⁽¹⁰⁾,⁹⁽¹¹⁾-estratetraen-3-ol.

Example IX

By following the method of the preceding Example, 1.5 g. of 17β-acetyl-Δ¹,³,⁵⁽¹⁰⁾-estratriene-3,17α-diol was treated with 4.5 g. of chloranil in 225 ml. of dioxane-terbutanol (4:1), thus yielding 17β-acetyl-Δ¹,³,⁵⁽¹⁰⁾,⁹⁽¹¹⁾-estratetraene-3,17α-diol.

We claim:
1. A compound of the following formula:

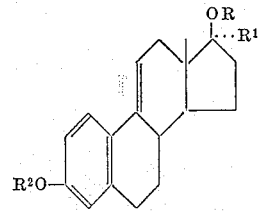

wherein R is selected from the group consisting of hydrogen and a hydrocarbon carboxylic acyl group of less than 12 carbon atoms; R¹ is selected from the group consisting of a lower alkenyl and a lower alkynyl group and R² is selected from the group consisting of hydrogen, lower alkyl and a hydrocarbon carboxylic acyl group of less than 12 carbon atoms.

2. The 3-methyl ether of 17α-ethynyl-Δ⁹⁽¹¹⁾-dehydroestradiol.
3. 17α-ethynyl-Δ⁹⁽¹¹⁾-dehydro-estradiol.
4. The 3,17-diacetate of 17α-ethynyl-Δ⁹⁽¹¹⁾-dehydroestradiol.
5. 17α-vinyl-Δ⁹⁽¹¹⁾-dehydro-estradiol.
6. A compound of the following formula:

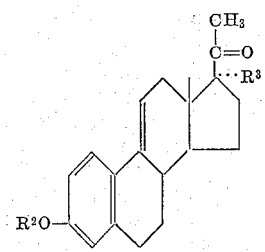

wherein R² is selected from the group consisting of hydrogen, lower alkyl and a hydrocarbon carboxylic acyl group of less than 12 carbon atoms; and R³ is selected from the group consisting of hydrogen, hydroxy and hydrocarbon carboxylic acyloxy of less than 12 carbon atoms.

7. 17β-acetyl - Δ¹,³,⁵⁽¹⁰⁾,⁹⁽¹¹⁾ - estratetraen-3-ol.
8. 17β-acetyl-Δ¹,³,⁵⁽¹⁰⁾,⁹⁽¹¹⁾-estratetraene-3,17-diol.
9. A process for the production of a compound of the following formula:

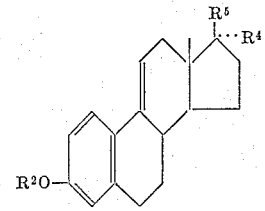

wherein R² is selected from the group consisting of hydrogen, lower alkyl and hydrocarbon carboxylic acyl of less than 12 carbon atoms; R⁴ is selected from the group consisting of hydrogen, lower alkyl, lower alkenyl and lower alkynyl; R⁵ is selected from the group consisting of hydroxy and hydrocarbon carboxylic acyloxy of less than 12 carbon atoms and R⁴ and R⁵ together represent keto, comprising reacting a compound of the following formula:

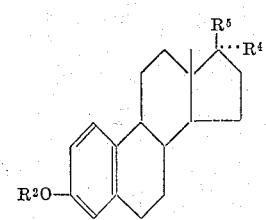

wherein R², R⁴ and R⁵ have the same meaning set forth above, with a quinone having an oxidation-reduction potential of less than −0.5.

10. The process of claim 9 wherein the starting material is the 3-methyl ether of estrone and the quinone is chloranil.

11. The process of claim 9 wherein the starting material is the 3-methyl ether of estradiol and the quinone is chloranil.

12. The process of claim 9 wherein the starting material is estrone and the quinone is 2,3-dichloro-5,6-dicyano-1,4-benzoquinone.

13. The process of claim 9 wherein the starting material is 3-methoxy-17α-ethynyl-estradiol.

14. The process of preparing $\Delta^{9(11)}$-dehydro-estradiol comprising reacting 3-lower alkoxy-estradiol with chloranil followed by reaction of the thus formed 3-lower alkoxy - $\Delta^{9(11)}$ - dehydro-estradiol with pyridine hydrochloride.

15. A process for the production of a compound of the following formula:

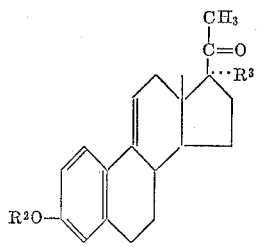

wherein $R^2$ is selected from the group consisting of hydrogen, lower alkyl and hydrocarbon carboxylic acyl of less than 12 carbon atoms; and $R^3$ is selected from the group consisting of hydrogen, hydroxy and hydrocarbon carboxylic acyloxy of less than 12 carbon atoms, comprising reacting a compound of the following formula:

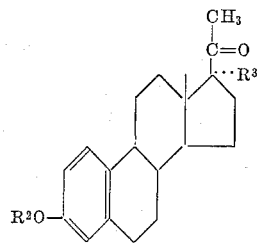

wherein $R^2$ and $R^3$ have the same meaning described above with a quinone having an oxidation-reduction potential of less than —0.5.

References Cited in the file of this patent
UNITED STATES PATENTS 2,885,413  Hogg et al. _____ May 5, 1959
3,082,225  Reimann _____ Mar. 19, 1963

OTHER REFERENCES

Fieser et al.: Steroids 1959, page 463, Reinhold Pub. Co., New York, New York.